(12) United States Patent
Panesar et al.

(10) Patent No.: US 11,033,825 B2
(45) Date of Patent: *Jun. 15, 2021

(54) USER ANALYSIS SYSTEM AND METHOD

(71) Applicant: Sony Interactive Entertainment Inc., Tokyo (JP)

(72) Inventors: Pritpal Singh Panesar, London (GB); Mohammed Mansoor Nusrat, London (GB); Nicholas Anthony Edward Ryan, London (GB); Hugh Alexander Dinsdale Spencer, London (GB)

(73) Assignee: Sony Interactive Entertainement Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/475,257

(22) PCT Filed: Jan. 5, 2018

(86) PCT No.: PCT/GB2018/050023
§ 371 (c)(1),
(2) Date: Jul. 1, 2019

(87) PCT Pub. No.: WO2018/127704
PCT Pub. Date: Jul. 12, 2018

(65) Prior Publication Data
US 2019/0329138 A1     Oct. 31, 2019

(30) Foreign Application Priority Data

Jan. 9, 2017 (GB) .................................. 1700320
Jun. 23, 2017 (GB) .................................. 1710056

(51) Int. Cl.
*A63F 13/35* (2014.01)
*A63F 13/795* (2014.01)
(Continued)

(52) U.S. Cl.
CPC .......... *A63F 13/795* (2014.09); *A63F 13/216* (2014.09); *A63F 13/35* (2014.09);
(Continued)

(58) Field of Classification Search
CPC ...... A63F 13/795; A63F 13/216; A63F 13/35; A63F 13/46; A63F 13/5375; A63F 13/67;
(Continued)

(56) References Cited

U.S. PATENT DOCUMENTS 9,498,704 B1   11/2016 Cohen
2009/0209337 A1   8/2009 Vrignaud
(Continued)

FOREIGN PATENT DOCUMENTS

EP   3565648 A1   11/2019

OTHER PUBLICATIONS

Examination Report for corresponding GB Application No. GB1710056.1, 4 pages, dated Nov. 27, 2019.
(Continued)

*Primary Examiner* — Corbett B Coburn
(74) *Attorney, Agent, or Firm* — Matthew B. Dernier, Esq.

(57) ABSTRACT

A user analysis method of assisting a current user within the videogame, includes: obtaining an indication that a hint is required for a scenario within the videogame; and if so, providing a hint to the current user relating to successful behaviour in the scenario; where providing a hint comprises: obtaining one or more indicators of behaviour for the scenario within the videogame, a difference detecting step comprising detecting a respective difference between the one or more obtained indicators of behaviour and corresponding data derived from a corpus of measured indicators of behaviour previously generated from a subset of other users detected to have a predetermined level of success in (Continued)

the scenario, and the providing step comprising providing a hint to the current user indicating a change in one or more behaviours that reduces a respective difference in the one or more measured indicators of behaviour between the current user and the subset of other users detected to have a predetermined level of success in the scenario.

15 Claims, 2 Drawing Sheets

(51) Int. Cl.
    *A63F 13/216*     (2014.01)
    *A63F 13/46*     (2014.01)
    *A63F 13/5375*     (2014.01)
    *A63F 13/67*     (2014.01)
    *A63F 13/798*     (2014.01)
    *A63F 13/79*     (2014.01)

(52) U.S. Cl.
    CPC .......... *A63F 13/46* (2014.09); *A63F 13/5375* (2014.09); *A63F 13/67* (2014.09); *A63F 13/79* (2014.09); *A63F 13/798* (2014.09); *A63F 2300/305* (2013.01); *A63F 2300/558* (2013.01)

(58) Field of Classification Search
    CPC .. A63F 13/79; A63F 13/798; A63F 2300/305; A63F 2300/558
    See application file for complete search history.

(56) References Cited

U.S. PATENT DOCUMENTS

| | | |
|---|---|---|
| 2010/0041475 A1 | 2/2010 | Zalewshi |
| 2012/0276992 A1* | 11/2012 | Moinuddin ........... A63F 13/798 463/31 |
| 2014/0255881 A1 | 9/2014 | Rom |
| 2016/0045828 A1 | 2/2016 | Bowron |
| 2017/0270128 A1* | 9/2017 | Smith ................. G06F 16/9535 |
| 2019/0329138 A1 | 10/2019 | Panesar |
| 2020/0155947 A1* | 5/2020 | Panesar ................... A63F 13/35 |

OTHER PUBLICATIONS

International Search Report and Written Opinion for corresponding PCT Application No. PCT/GB2018/050023, 17 pages, dated Mar. 22, 2018.

Combined Search and Examination Report for correspodning GB Application No. GB1710056.1, 2 pages, dated Nov. 28, 2017.

* cited by examiner

USER ANALYSIS SYSTEM AND METHOD

BACKGROUND

The present invention relates to a user analysis system and method.

Modern games can be very complex and feature rich. Examples of such games are so-called 'open world' games, where the user is free to explore and interact with a wide range of non-player characters, with limited guidance as to what to do and typically a wide range of options available as to how they might interact (either in terms of dialogue or in terms of weaponry and tactics, depending on the encounter).

To help guide the user in a nonintrusive way, it is therefore commonplace for developers to display useful messages about gameplay technique whilst the game is loading. Over time, this exposes the user to useful information about the game, whilst giving them something of interest to read while the game loads.

SUMMARY

However, there is a limit to the number of such messages that can be provided, and after a while their value to the user decreases.

The present invention seeks to mitigate or alleviate this problem.

In a first aspect, a user analysis method of assisting a current user within the videogame is provided.

In another aspect, user analysis system arranged to assist a current user within the videogame is provided.

Further respective aspects and features of the invention are defined in the appended claims.

BRIEF DESCRIPTION OF THE DRAWING

Embodiments of the present invention will now be described by way of example with reference to the accompanying drawings, in which.

DETAILED DESCRIPTION

A user analysis system and method are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

An example of a system upon which games may be played is the Sony® PlayStation 4 ® entertainment device or console.

Figure 1:
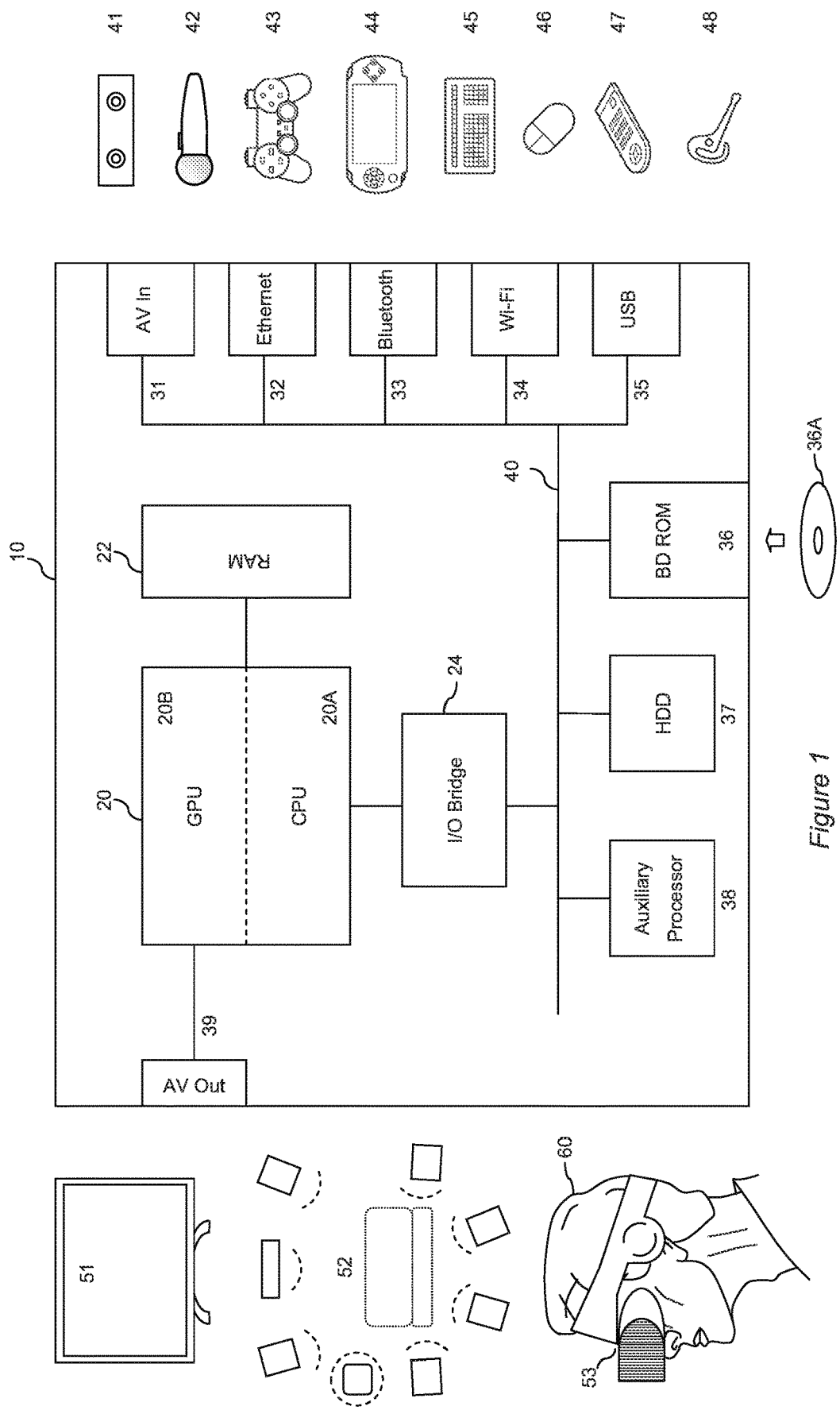
FIG. 1 is a schematic diagram of an entertainment device in accordance with an embodiment of the present invention.

FIG. 1 schematically illustrates the overall system architecture of a Sony® PlayStation 4® entertainment device. A system unit 10 is provided, with various peripheral devices connectable to the system unit.

The system unit 10 comprises an accelerated processing unit (APU) 20 being a single chip that in turn comprises a central processing unit (CPU) 20A and a graphics processing unit (GPU) 20B. The APU 20 has access to a random access memory (RAM) unit 22.

The APU 20 communicates with a bus 40, optionally via an I/O bridge 24, which may be a discreet component or part of the APU 20.

Connected to the bus 40 are data storage components such as a hard disk drive 37, and a Blu-ray® drive 36 operable to access data on compatible optical discs 36A. Additionally the RAM unit 22 may communicate with the bus 40.

Optionally also connected to the bus 40 is an auxiliary processor 38. The auxiliary processor 38 may be provided to run or support the operating system.

The system unit 10 communicates with peripheral devices as appropriate via an audio/visual input port 31, an Ethernet® port 32, a Bluetooth® wireless link 33, a Wi-Fi® wireless link 34, or one or more universal serial bus (USB) ports 35. Audio and video may be output via an AV output 39, such as an HDMI port.

The peripheral devices may include a monoscopic or stereoscopic video camera 41 such as the PlayStation Eye®; wand-style videogame controllers 42 such as the PlayStation Move® and conventional handheld videogame controllers 43 such as the DualShock 4 ®; portable entertainment devices 44 such as the PlayStation Portable® and PlayStation Vita®; a keyboard 45 and/or a mouse 46; a media controller 47, for example in the form of a remote control; and a headset 48. Other peripheral devices may similarly be considered such as a printer, or a 3D printer (not shown).

The GPU 20B, optionally in conjunction with the CPU 20A, generates video images and audio for output via the AV output 39. Optionally the audio may be generated in conjunction with or instead by an audio processor (not shown).

The video and optionally the audio may be presented to a television 51. Where supported by the television, the video may be stereoscopic. The audio may be presented to a home cinema system 52 in one of a number of formats such as stereo, 5.1 surround sound or 7.1 surround sound. Video and audio may likewise be presented to a head mounted display unit 53 worn by a user 60.

In operation, the entertainment device defaults to an operating system such as a variant of FreeBSD 9.0. The operating system may run on the CPU 20A, the auxiliary processor 38, or a mixture of the two. The operating system provides the user with a graphical user interface such as the PlayStation Dynamic Menu. The menu allows the user to access operating system features and to select games and optionally other content.

In an embodiment of the present invention the entertainment device, operating under suitable software instruction, may act as a user analysis system by implementing a method that provides tailored hints and advice for the user.

In an embodiment of the present invention, the method comprises maintaining one or more statistics about one or more aspects of gameplay by the user. Example statistics can relate to various measures of success or failure, and typically these will positively correlate with measures relating to various in-game behaviours. These measures can for example be specific to an individual encounter or class of encounters, to the possession or use of an object or character ability, and/or to overall measures of success within a particular quest, a particular level or area, or in relation to the game as a whole. Some non-limiting examples are provided later herein.

It will be appreciated that typically a videogame is played by many tens or hundreds of thousands of users, and cumulatively may be played by millions. Consequently, their respective recorded statistics relating to successes, failures and behaviours can be collated and analysed to determine what behaviours correlate with success, in order to provide advice to the current user without the need to create pre-scripted hints (although of course these can still be provided if desired).

For the purposes of explanation, a non-limiting example of the scheme may be illustrated with reference to a current user's encounter with a monster within a game. The monster has a vulnerability to a particular weapon, has a powerful attack within a range of 3 metres, but cannot move quickly when in water.

In this illustrative example, the user is having difficulty beating this monster. The encounter may be a one-off event that the user has failed to complete, or this monster may be of a type regularly encountered but where the user has relative difficulty beating the monster.

This difficulty may be automatically detected for example by measuring the time taken between initially engaging with the monster and defeating it, and/or measuring the number of weapon strikes made against the monster and/or measuring the amount of health damage taken by the user's character during the battle with the monster, and/or the number of times the user has died battling the monster. These measurements can be considered as proxies for the user's relative success or failure in battling the monster. Other measurements will be apparent to the skilled user, and as noted above different measurements may be suitable for different scenarios.

Any suitable combination of measures indicative of how difficult the user finds the encounter with the monster may then be compared with measures collated and analysed from a plurality of other users. This comparison may be done on a remote server, or the analysed results may be periodically transmitted to the entertainment device for local comparison (for example with any patches or DLCs, or as a periodic background activity). The comparison may also be made based on only a subset of other users, for example those users having a similar in-game skill level, character class, weapon collection or the like that may influence their gameplay or constrain their current options. Such a subset of users may be termed 'peer' users. The peer group may alternatively or in addition be selected according to geographic or demographic criteria, or may be limited to users on a particular server or in a particular 'clan' or similar self-identified grouping within the game. Such refinements help to make the comparison between the current user and the sample population more relevant. For example, limiting comparisons to those users in the same clan may result in convergence on a distinctive 'clan style' of play, as will be seen later herein.

Among other users, there will be a range of levels of success and failure. The current user's success may be compared against the average level of success (for example any suitable combination of an average fight duration, average number of hits, and average damage taken during a successful encounter with the monster that resulted in its defeat), and if the user's success rate is below the average for the sample population, this can be detected as indicating a need for advice about battling the monster.

It will be appreciated that determining the need for advice may be based on any suitable measure of success or failure (i.e. lack of success) and on any suitable deviation from the mean of that measure derived from other users.

Hence for example, instead of simply determining whether the user is below average, it may be determined that the user is 0.5, 1 or 1.5 standard deviations below the mean, or 1 standard deviation below the mean for only the top 10% of players under comparison, as determined based on one or more collated measures of success. Hence the former example may provide remedial guidance (because the user one of the worst overall players with respect to this monster) whilst the latter example may provide aspirational guidance (because the user is not yet as good as the best). It will be appreciated that different measures may be used depending for example on a user-selected difficulty level, either for the game overall or specifically for the level of hint provided.

Alternatively, a detection of failure may be determined by setting a predetermined threshold number of times that the user might die when fighting the same monster. This threshold may be a preset number or may be derived algorithmically, for example as a function of the difference between in-game 'levels' of the user's character and the monster. Hence where the monster is of a higher level than the user's character, more deaths might be expected before the user is deemed to be struggling. Similarly predictable measures of failure may be automatically detected, such as not reaching a checkpoint within a predetermined time, or attempting to perform an action without possessing a required object, attribute/talent or skill level. However, in these cases whilst the failure may be predictable, the reason for failure may not be and would benefit from analysis. It will be appreciated that such a measure of failure is equivalent to a measure of a lack of success.

In any event, once it has been detected that the user would benefit from advice in battling the monster, it becomes desirable to provide that advice.

In one embodiment of the present invention, advice relating to the monster has already been prepared by the game developer, but has not yet been seen by the user, or was seen sufficiently long ago that the user has forgotten about it (this may occur when there are hundreds of different hints that may be selected during game loading). Accordingly, advice relating to the monster may be given a high priority within a hint selecting algorithm, so that the developer's advice is presented more prominently or frequently until the user's rate of success improves.

Alternatively or in addition, there may not be advice relating to this particular monster, or more generally there may not be advice relevant to how the user's particular behaviour needs to be corrected in order to achieve success in a given scenario.

Consequently in an embodiment of the present invention, a comparison of the measured statistics for the encounter between the current user and the relevant sample population of users can be undertaken. For example in the remedial example where the user's performance against the monster is relatively poor, statistics relating to those players whose success is above average may be used, whilst in the aspirational example where the user is good but could be better, statistics relating to the top 10% of players may be used.

In relation to the example of the monster encounter, the following statistics may be found:
current user fights with weapon A;
current user typically manages 20 hits;
current user stands on average 2 m from the monster;
current user fights the monster on terrain type i. (land) 70% of the time, and on terrain type ii. (water) 30% of the time; and
current user dies on average during 70% of encounters with the monster.
Meanwhile, the statistics for above-average players are:
these players fight with weapon A 30% of the time, and with weapon B 70% of the time;

these players typically manage 30 hits;
these players stand on average 2.5 m from the monster;
these players fight the monster on land 50% of the time and on water 50% of the time;
these players die on average during 25% of encounters with the monster.

Further, the statistics for the best players are:
these players fight with weapon A 10% of the time, and with weapon B 90% of the time;
these players typically manage 35 hits;
these players stand on average 3.5 m from the monster;
these players fight the monster on land 25% of the time and on water 75% of the time;
these players die on average during 5% of encounters with the monster.

Of these statistics, the choice of weapon, the distance from the monster and the choice of terrain all relate to how superior players chose to fight the monster (i.e their behaviour), whilst the number of hits and their survival rate relate to their relative success. As noted above, the success related statistics can initially be used to determine if the user needs help (for example by comparison with an average value for these measurements), and here they can be used to determine a subset of (more) successful users against whose in-game behaviours the current user's own behaviours can be compared.

Accordingly, a hint generator may be provided that looks for the largest differences between the user's behavioural statistics and those of successful players.

In the remedial case, in a comparison between the user's statistics and those of above average players, the largest difference appears to be the choice of weapon, with the current player being in a 30% minority group.

Consequently the generator may create a hint based on the available data which indicates that it is better to choose weapon B to fight this monster. Clearly language can be used that is appropriate to the game, such as "Experienced knights report that [weapon B] was particularly effective against [the Monster]". Any suitable fiction could be provided to deliver this advice in a natural manner, such as for example journal entries from a mentor.

Alternatively where the deficiency in behaviour relates to an action that can be characterised by a continuous variable (such as timing, distance or speed—for example when cornering on a race track), a corrective message may indicate a change in behaviour needed to reduce a numeric gap between the user's measured behaviour and that of the successful peers. For example 'Top drivers slow down to 60 miles per hour on hairpin bends', or 'Drivers of [player's current car] report they need to brake earlier on hairpin bends'.

Returning to the example, once the current users' poor choice of weapon has been addressed so that the user now fights with weapon B, their performance may improve, but could improve further.

Hence in the aspirational case, in a comparison between the current user's updated statistics and those of the best players, the largest difference could now either be the choice of terrain or the average distance from the monster.

It will be appreciated therefore that in some circumstances, there is no clear overall 'winner' in terms of the most different behaviour, or that the difference in behaviour is not very large.

To address this, optionally the system can look at increasingly more successful players until a winning or sufficiently large difference in behaviour emerges. Hence for example the system may initially compare the user's behaviour with the top 50% of players (assuming the current user is initially below average), and if no clear guidance is detectable, move on successively to the top 25%, top 10%, top 5% and top 1% of players, to determine if a winning set of behaviours emerges. It will be appreciated that the particular percentages used are purely illustrative and non-limiting.

Alternatively or in addition, optionally for any comparison of behaviour the system may look at the measures of success relating to the different permutations of such statistics, for example comparing the death rate for those who stand at a distance on land against those who stand close in water, to choose which change of behaviour to hint at next.

Alternatively or in addition, where the overall population of other users is large enough to provide a statistically significant result for specific sub-sets of data, optionally the system may analyse the statistics for those players whose statistics indicate they choose to fight the monster in a generally similar way to the user, but in one case do so from a further distance, and in another case do so on different terrain. By comparing the change in death rate as a function of the change in these respective behaviours, the most advantageous change of behaviour can be identified and chosen to hint at next. Hence more generally where the sample population allows, the (rate of or absolute) change of success as a function of the (rate of or absolute) change of respective behaviours can be analysed to determine which change behaviour will provide the greatest change in success. Alternatively, simply the next largest difference between the current user's statistics and those of the compared population may be selected to hint at next.

In any event, optionally the system may elect to construct or promote a hint relating to a difference other than the largest difference. For example if the user has already received hints relating to the largest different M times, where M is a predetermined number selected by a game designer, then a hint relating to another difference in player behaviour may be chosen. Alternatively or in addition, hints relating to other differences may be provided on a random or ranked frequency basis simply for variety.

This process can continue until the user achieves a predetermined level of success (for example average success or top N percent where N is a predetermined number) within the compared population, or a predetermined maximum number of hints may be displayed in relation to a given scenario, or such a hint or hints may only be prioritised for a predetermined period of time in-game. Clearly if the hint is scenario specific and the scenario has ended, then that hint need not be displayed again (for example if the defeated monster was a one-off such as in a boss battle, or related to a quest that has been completed).

Hence more generally, a current user's measures of success during gameplay are compared with measures of success within a selected population of users to determine the current user's relative success, and where this success is below a threshold, a hint may be provided.

As noted previously this hint may have already been prepared by the developer, but is re-prioritised.

Alternatively, as noted previously the hint can be constructed in response to the apparent deficiencies in the user's behaviour compared to the sample population. This is done by comparing the current user's measure behaviours with the behavioural statistics of a successful subset of the selected population of users, and identifying those behaviours having the greatest difference with respect to those of the successful subset (or potentially any other contributing behaviour, as noted previously herein).

A hint can then be automatically constructed indicating a change in behaviour that would reduce this difference.

In this way, hints relevant to the individual behaviour of the current user can be constructed without the need of the developer to exhaustively anticipate and prepare such hints in advance. Furthermore, by comparing the current user's behaviour with a selected population of users more successful than the current user for a given scenario, bespoke hints that incrementally improve the user's performance can be automatically generated for whatever level of proficiency the user is at.

Variations to the basic concept of selecting or generating a relevant hint may also be envisaged. For example in an optional embodiment, the system can record what statistics have been used to select or generate hints (in the previous example of a fight against the monster, these may have been the user's choice of weapon or their choice of where in the environment to fight). Subsequently, if the user changes their behaviour in a manner that positively affects the statistics (for example by changing their weapon choice and/or fighting location so as to match that of the corpus of better players) and improve their success criteria (for example by successfully killing the monster, or doing so without dying themselves), then a 'hint' may be generated that provides positive feedback, congratulating the user on the change(s) to the relevant behaviour(s).

Hence more generally, the system records the user's statistics when a hint is initially presented, and detects one or more changes in user behaviour consistent with the proposed one or more changes in behaviour indicated by the hint. When detected, optionally the system provides a congratulatory 'hint' (i.e. a message provided through the same method as the earlier hint). Alternatively or in addition, the system can provide a new hint to change a different user behaviour, on the basis that the first behaviour is now rectified and so additional behaviours can be addressed to further improve performance. As was noted previously, often the first hint will be based on the largest difference in behaviour between the user and the successful corpus, and so the next hint may relate the next largest difference in behaviour. Alternatively, the next hint may be generated using a more restrictive corpus of higher achieving users; previously herein it was suggested that there may be 'remedial' and 'aspirational' hints; accordingly, the user changes their behaviour in response to a remedial hint, and this is detected, then a hint based on a more selective corpus of high achieving users may be generated as an aspirational next hint. More generally, the next hint will relate to a change in behaviour not previously hinted at, or generated from a refined reference corpus.

In open world games a user may have several dozen quests open in parallel. Optionally a hint system may respond to the most recent play session or sessions to provide hints that are current and relevant, and/or may record user behaviour with meta data associating it to the quest or quests that were active at the time, so as to provide hints in relation to user behaviour that occurs during that quest or quests (it will also be appreciated that this meta data can be used within the corpus of data from other players to select an appropriate subset of corpus data as a function of active quest).

However, the user may optionally be provided with more control over the hint process, by requesting hints on a particular topic. It will be appreciated that a user who is having difficulty beating one monster, or overcoming one obstacle, may also be having difficulty with other opponents or puzzles in the game. Furthermore as noted above, the user may have a number of different quests available to them. It is likely that when a user is frustrated with progress on one quest, they will switch to a different quest in order to continue play, but in fact wish for hints on how to progress the other quest. In these circumstances, it may therefore be difficult to discern what hints would be most beneficial to the user's enjoyment of the game, because the user's current play and choice of quests does not necessarily reflect the areas of the game where the user needs most help.

Accordingly, in an optional embodiment of the present invention the user can request hints on a particular issue. To provide an accessible user interface, this may simply be done by identifying which are available quests the user would like hints upon, so that user behaviour associated with that quest can be prioritised for hint generation. Alternatively or in addition, the user may be allowed to enter or select keywords to indicate areas of interest to them; for example the name of a monster they would like to fight more effectively, or the name of an in-game location where they are persistently encountering difficulties or cannot find an entrance or critical object or the like.

Again as with quests, user behaviour may be associated with meta data naming defeated enemies and/or specific locations, potentially as well as the names of active quests.

Consequently when a user asks how to defeat monster A in location B during quest C, a relevant corpus of successful users can be created by filtering for these meta data, and a relevant hint can be generated and provided to the user, for example as an immediate reply in response to the user's formulation of the query.

Furthermore, it will be appreciated that potentially a user may ask for a hint about a scenario that the user themselves has not yet encountered or played enough to have a useful set of recorded behaviour data of their own; for example the user may simply wish to complete a particular quest with the minimum of fuss for whatever reason (for example, due to real-world time pressures). In this case, the hint system may substitute the non-existent or insufficient behaviour statistics of the user with behaviour statistics from one or more average users in the corpus, and compare them with more successful users in the corpus in a similar manner to that described previously herein in order to generate hints for the user as if they were an average player. It will also be appreciated that the user may be ranked based on previous measurements of success within the game, and the substitute user or users may be selected from those users of similar rank within the corpus in order to best approximate the current user and hence generate appropriate advice.

As noted previously, by contrast to the immediate reply described above in response to a dedicated hint request, it is normally envisaged that such hints will be provided during loading screens or as part of an 'idle' mode, which may be triggered when no input has been detected for a predetermined of time.

However alternatively or in addition, in an optional embodiment of the present invention one or more hints are provided to the user after gameplay is complete, as a form of 'post-match analysis'. This may be provided on the same platform as the game (for example, as a modification to descriptive text associated with a highlighting of the game on the entertainment device), or may be provided on a separate platform to the game; for example, the user may register a mobile phone number with the game developer or publisher, or the administrator of a network accessible by the entertainment device, and the game may output hint text for transmission to that mobile phone by text. Alternatively or in addition, the mobile phone may download an app, and the user may provide login credentials that identify them to game developer or publisher or the administrator of the network, so that such hint texts can be routed as data to the app. It will be appreciated that where hints are sent to a different platform such as a mobile phone, then potentially they can (also) be sent whilst gameplay is ongoing.

In this way, the user can receive hints that will help to improve their gameplay in a convenient manner that enables reflection at a time convenient to the user, and, in the case of a text thread or an app that stores such messages, the user can look back over a succession of hints either to remind themselves of useful information have yet to put into practice, or to reflect on how they have progressed as a consequence of these hints.

It will be appreciated that when a game is newly launched, there will not be a pre-existing corpus of user statistics available from the public. However, such statistics can be gathered from a quality assurance testing phase of the game, or so-called early access or beta testing of the game to provide an initial set of user statistics.

Furthermore, in an embodiment of the present invention the game uploads the current user's statistics to a central server for incorporation into the wider corpus. Typically this will be anonymized, but alternatively at least some of the statistics could form part of a ranking scheme, for example for a multiplayer component of the game.

Non-limiting examples of measures of success include:
average level of health, either overall or after a battle;
average amount of money, either overall or after a transaction;
the acquisition of predetermined objects;
amount of available terrain explored; and
the user's character's in-game capabilities (e.g. incremental improvements in strength, talents, skills or the like commonly found in games).

These measures of success could be absolute within the overall game, an area of the game, a character level, and/or a particular quest, or relative to an elapsed time within the overall game, an area of the game, a character level, and/or a particular quest.

Non-limiting examples of behaviour that could be measured and for which hints could be provided include:
i. Timing:
when to strike or block an opponent (generally, in relation to a particular class, or in relation to an individual opponent);
whether to interact with a another in game character during day or night (again generally, in relation to a particular class, or in relation to an individual opponent);
whether to interact with another character after performing some other task; and
similarly, when to accelerate or brake on a racetrack.
ii. Weaponry/Equipment:
a particular choice of a weapon for an enemy (for example in relation to a particular class or in relation to an individual opponent)
a particular choice of armour for an enemy (for example in relation to a particular class or in relation to an individual opponent);
a particular choice of spell for an enemy (for example in relation to a particular class or in relation to an individual opponent); and
similarly, a particular choice of vehicle/tires/fuel load etc for a particular race.
iii. Tactics:
what moves to use against an enemy (for example in relation to a particular class or in relation to an individual opponent);
where to fight an enemy (for example in relation to a particular class or in relation to an individual opponent);
who to use to fight an enemy (for example in relation to a particular class or in relation to an individual opponent); and
similarly, when to use a turbo charger or other limited resource during a race.
iv. Commerce:
with whom to buy or sell an item (either an individual person or item, or a class of people or items);
when to buy or sell an item (e.g. if seasonal or subject to supply/demand);
how to buy or sell an item (e.g. if a better price is obtained after drinking a charm potion); and
similarly, whether to upgrade engine, tyres, spoilers or other parts of a car given its current configuration.
v. Exploration:
when to use a particular tool (torch, pickaxe, compass etc) in a given environment or particular place;
whether to conduct an additional search in a given environment or particular place (e.g. if a below-average amount of treasure has been found in an area);
whether to talk to a particular character or interact with a certain object (for example, if the elapsed time on a quest or between checkpoints in a game exceeds expectations, it may be because key information is missing; in the circumstances consider comparing the user's interactions with non-player characters or objects with those of successful players to see which were the most popular); and
similarly, whether to look for/take a shortcut somewhere on the race track.
vi. Skills and talents:
which skill or talent to unlock in a skill tree (for example in order to access a desired ability, location, or object);
what skill or talent to improve in a skill tree (for example in order to access a desired ability, location, or object); and
what skill or talent to enable in a situation (for example where only a subset of skills or talents are usable at any one time).

Other examples will be apparent to the skilled person.

Figure 2:
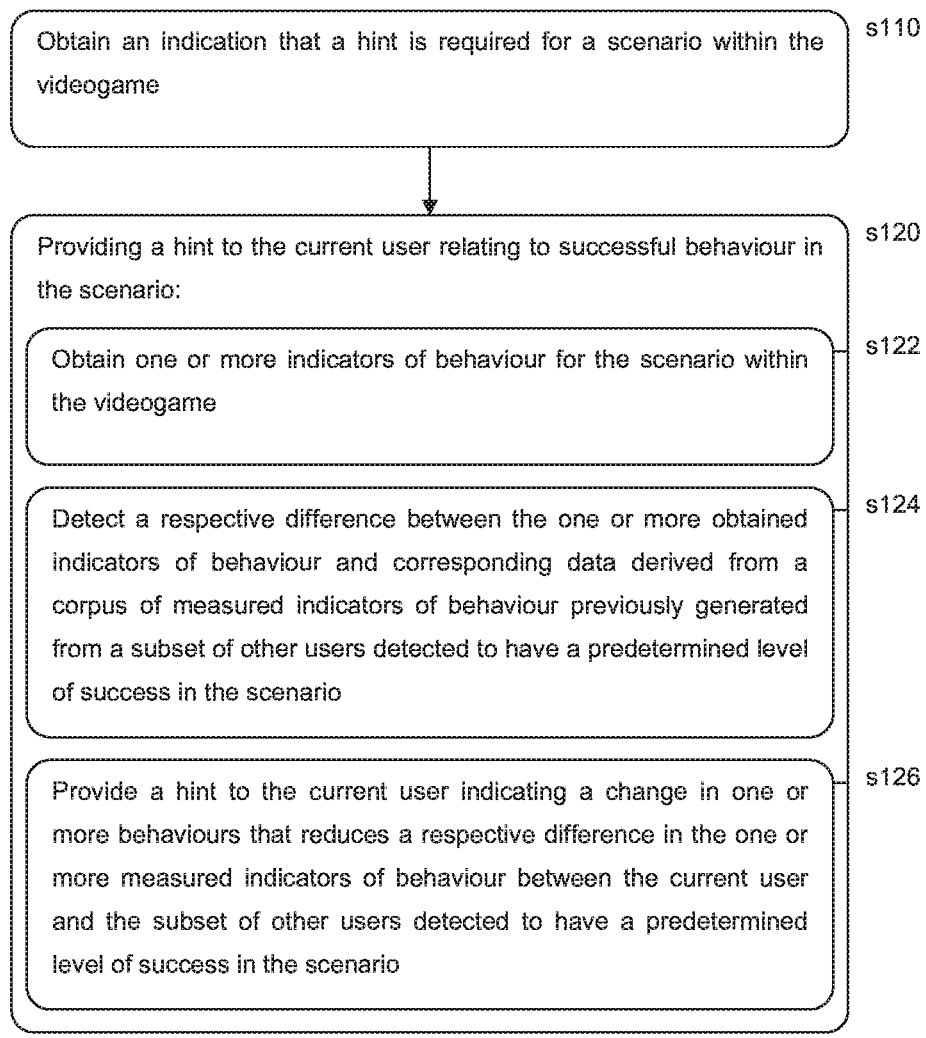
FIG. 2 is a flow diagram of a user analysis method of assisting a current user within the videogame in accordance with an embodiment of the present invention.

Turning now to FIG. 2, in a summary embodiment of the present invention, a user analysis method for assisting a current user within the videogame comprises:

In a first step s110, obtaining an indication that a hint is required for a scenario within the videogame.

In a second step s120, providing a hint to the current user relating to successful behaviour in the scenario. As noted previously herein, hint can be constructed or selected in response to the apparent deficiencies in the user's behaviour compared to the sample population, or in response to an assumed player performance in the case where the user requests a hint for a scenario they have not yet played, and in the summary embodiment, this is done by the following sub-steps:

In a first sub-step s122, obtaining one or more indicators of behaviour for the scenario within the videogame, as described previously herein.

In a second sub-step s124, detecting a respective difference between the one or more obtained indicators of behaviour and corresponding data derived from a corpus of measured indicators of behaviour previously generated from a subset of other users detected to have a predetermined level of success in the scenario, as described previously herein.

And in a third sub-step s126, providing a hint to the current user indicating a change in one or more behaviours that reduces a respective difference in the one or more measured indicators of behaviour between the current user and the subset of other users detected to have a predetermined level of success in the scenario, as described previously herein.

In an instance of the summary embodiment, the step of obtaining an indication that a hint is required comprises receiving a user input indicative of a scenario for which a hint is sought, as described previously herein, and the evaluating step comprises a step of filtering the corpus of measured indicators of behaviour previously generated from other users for the indicated scenario.

In an instance of the summary embodiment, the method comprises a step of measuring one or more indicators of success for a scenario within the videogame as played by the current user; and the step of obtaining an indication that a hint is required comprises detecting if the one or more measured indicators of success are below an evaluation threshold. As described previously herein, indicators of success may be based on measures of success, failure or a combination of both, optionally weighted according to significance as determined by the game designer.

In an instance of the summary embodiment, the method also comprises the step of evaluating the one or more measured indicators of success with respect to data derived from a corpus of measured indicators of success previously generated for other users for the scenario, and the evaluation threshold is based upon the data derived from the corpus of measured indicators of success previously generated for other users for the scenario. As noted previously, this means that the current user's success can be gauged against those of their peers, as an alternative to using predetermined thresholds of success (although of course these can still be used).

In this instance, the evaluation threshold is for example one selected from the list consisting of the average success of the subset of other users, M % below the average success of the subset of other users (where M is a predetermined number), and the $P^{th}$ standard deviation below the average success of the subset of other users (where P is a predetermined number), as described previously herein.

In an instance of the summary embodiment, the step of obtaining one or more indicators of behaviour for the scenario within the videogame comprises one selected from the list consisting of:
  i. a measuring step comprising measuring one or more indicators of behaviour for the scenario within the videogame as played by the current user; and
  ii. obtaining the one or more indicators of behaviour from the corpus of measured indicators of behaviour previously generated from a predetermined subset of other users for the scenario.

As described previously herein, option i. enables a comparison of the difference in behaviour between the current user and the mean behaviour of a sample of other users (or optionally the behaviour of an individual user scoring near the sample mean or simply selected from within a selected subset of the corpus). Where option i. assumes the user has played the relevant scenario, option ii. enables the user to specify a scenario they have not yet played, and so indicators of behaviour from the corpus (for example from an average of users, or an average user) may be selected to substitute for the current user in the hint system; this allows the hint system to otherwise operate transparently in the case where the user has not actually played the scenario.

In an instance of the summary embodiment, at least one evaluating difference detecting step comprises comparing the current user with a subset of other users for the scenario, the subset being one selected from the list consisting of: all users, all users except those outside a predetermined number of standard deviations from the mean, above-average users, and the most successful N % of users where N is a predetermined number; as determined by their respective evaluation of their measured indicators of success.

In an instance of the summary embodiment, at least one difference detecting step comprises comparing the current user with a subset of other users for the scenario, the subset being one selected from the list consisting of: users within a common geographical region (e.g. town, county, country or continent), users within a common demographic group (e.g. age bracket, gender, nationality and/or language), users within a self-identified group within the game (e.g. a clan), users within the same in-game location, and users following the same in-game quest. In the case of a clan, it will be appreciated that poor players will receive hints that reflect the playing style of the best players within the clan, which may result in convergence on a clan style, influenced by the clan leaders. In some massively multiplayer online games, this may result in new tactics and behaviours emerging.

In an instance of the summary embodiment, the providing step comprises the steps of calculating the respective differences between the one or more measured indicators of behaviour of the current user and those of the subset of other users detected to have a predetermined level of success in the scenario, and selecting the behaviour corresponding to one selected from the list consisting of: the largest respective difference, and a difference other than the largest respective difference, as the subject of the hint, as described previously herein.

In an instance of the summary embodiment, the providing step comprises the step of providing the hint to one or more selected from the list consisting of: an application separate from the videogame (such as the OS on the host device); and an application is hosted by a different device to that hosting the videogame (such as an app on a mobile phone; in this case the hint may be provided to the app via the OS on the host device and/or via a server or other intervening programs and infrastructure as required).

In an instance of the summary embodiment, the method comprises the steps of: measuring one or more indicators of behaviour for the scenario within the videogame as played by the current user;

measuring one or more indicators of success for a scenario within the videogame as played by the current user; associating with the measured indicators of behaviour and success metadata indicative of the scenario; and adding the measured indicators of behaviour and success and associated metadata to the corpus.

In this way, information gathered from the user's own play is added to the corpus of measured indicators of behaviour and success generated from users of the videogame.

It will be appreciated that the above methods and techniques may be carried out on conventional hardware suitably adapted as applicable by software instruction or by the inclusion or substitution of dedicated hardware.

Thus the required adaptation to existing parts of a conventional equivalent device may be implemented in the form of a computer program product comprising processor implementable instructions stored on a non-transitory machine-readable medium such as a floppy disk, optical disk, hard disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

As noted previously, a suitable piece of hardware is the Sony® PlayStation 4 ® entertainment device or console, operating under suitable software instruction.

Accordingly, in a summary embodiment of the present invention, a user analysis system for assisting a current user within the videogame (e.g. the entertainment device 10) comprises a hint indication obtaining processor (e.g. CPU 20A operating under suitable software instruction) adapted to obtain an indication that a hint is required for a scenario within the videogame. The hint indication obtaining processor may in turn comprise a measuring processor (e.g. CPU 20A operating under suitable software instruction) adapted to measure one or more indicators of success for a scenario within the videogame as played by the current user, or a hint request processor operable to receive a user input indicative of a scenario for which a hint is sought. The system also comprises a providing processor (e.g. CPU 20A operating under suitable software instruction) adapted to provide a hint to the current user relating to successful behaviour in the scenario. The providing processor is also adapted to obtain one or more indicators of behaviour for the scenario within the videogame, and adapted to detect a respective difference between the one or more obtained indicators of behaviour and corresponding data derived from a corpus of measured indicators of behaviour previously generated from a subset of other users detected to have a predetermined level of success in the scenario, and to provide a hint to the current user indicating a change in one or more behaviours that reduces a respective difference in the one or more measured indicators of behaviour between the current user and the subset of other users detected to have a predetermined level of success in the scenario, as described previously herein.

It will be appreciated that in principle the providing processor may comprise a transmitter/receiver to transmit locally obtained hint indication, and optionally one or more measured indicators of behaviour for the scenario within the videogame as played by the current player, to a remote server that performs the difference detection with respect to at least part of the corpus, before either sending the difference date back, or sending the hint itself back to the providing processor (or a separate device such as a mobile phone). Hence the system may be distributed between the entertainment device hosting the game, and a back end server.

In an instance of this summary embodiment, the user analysis system comprises a measuring processor adapted to measure one or more indicators of success for a scenario within the videogame as played by the current user, and the hint indication obtaining processor comprises a detecting processor adapted to detect if the one or more measured indicators of success are below an evaluation threshold.

In an instance of this summary embodiment, as noted above the providing processor is adapted to provide the hint to an application separate from the videogame.

It will be appreciated that as noted above, the user analysis system may optionally implement any other of the methods and techniques disclosed herein when adapted by suitable software instruction to do so.

The invention claimed is:

1. A user analysis method of assisting a current user within a videogame, comprising the steps of:
   providing an automated user interface into which the current user enters descriptive information identifying one or more elements defining a scenario within the videogame about which the current user requests an automated hint to improve their gaming performance;
   providing the automated hint to the current user to improve their gaming performance in the scenario;
   wherein providing the automated hint comprises:
   obtaining one or more past statistical indicators of the current user, which represent past gaming behaviour of the current user in the scenario within the videogame, wherein the one or more past statistical indicators of the current user are retrieved from storage in a computer memory of a computerized gaming system;
   determining respective statistical differences between the one or more past statistical indicators of the current user and corresponding past statistical indicators of a subset of other users, among a plurality of other users, which represent past gaming behaviour of the subset of other users in the scenario within the videogame, wherein the past statistical indicators of the subset of other users are retrieved from storage in the computer memory of the computerized gaming system after the computerized gaming system has made a determination that such past statistical indicators of the subset of other users indicate a predetermined level of success in the scenario within the videogame; and
   formulating the automated hint, which if carried out by the current user, would produce a change in one or more of the respective differences and advance the gaming behaviour of the current user towards the predetermined level of success in the scenario within the videogame.

2. The user analysis method of claim 1, wherein the step of determining respective difference statistical differences includes selecting the subset of other users among a plurality of other users based on: (i) the one or more elements provided by the current user to define the scenario within the videogame; and (ii) determining that the subset of other users achieved the predetermined level of success in the scenario within the videogame.

3. The user analysis method of claim 1, further comprising:
   providing a further automated hint to the current user based on at least one other element of the scenario not provided through the automated user interface, wherein the automated hint is based on:
   measuring one or more indicators of success for the scenario within the videogame as played by the current user; and
   detecting whether the one or more measured indicators of success are below an evaluation threshold.

4. The user analysis method of claim 3, comprising:
   evaluating the one or more obtained indicators of success with respect to data derived from a corpus of measured indicators of success previously generated for other users for the scenario, wherein the evaluation threshold is based upon the data derived from the corpus of measured indicators of success previously generated for other users for the scenario.

5. The user analysis method of claim 4, wherein the evaluation threshold is one selected from the list consisting of:

i. the average success of the subset of other users;
ii. M % below the average success of the subset of other users, where M is a predetermined number; and
iii. the $P^{th}$ standard deviation below the average success of the subset of other users, where P is a predetermined number.

6. The user analysis method of claim 1, wherein the obtaining the one or more past statistical indicators of the current user for the scenario within the videogame comprises at least one of:
   i. measuring one or more indicators of behaviour for the scenario within the videogame as played by the current user; and
   ii. obtaining the one or more indicators of behaviour from a corpus of measured indicators of behaviour previously generated from a predetermined subset of other users, among the plurality of other users, for the scenario.

7. The user analysis method of claim 1, wherein the subset of other users, among the plurality of other users, is selected from one of:
   i. all users;
   ii. all users except those outside a predetermined number of standard deviations from the mean;
   iii. above-average users; and
   iv. the most successful N % of users where N is a predetermined number,
   as determined by their respective evaluation of their measured indicators of success.

8. The user analysis method of claim 1, wherein the subset of other users, among the plurality of other users, is selected from one of:
   i. users within a common geographical region;
   ii. users within a common demographic group;
   iii. users within a self-identified group within the game;
   iv. users within the same in-game location; and
   v. users following the same in-game quest.

9. The user analysis method of claim 1, wherein the providing the automated hint step comprises the steps of:
   calculating the respective statistical differences between the one or more past statistical indicators of the current user and the corresponding past statistical indicators of the subset of other users, and
   selecting the gaming behaviour of the current user from among:
   i. a largest of the respective statistical differences; and
   ii. a difference other than the largest of the respective statistical differences,
   as a subject of the automated hint.

10. The user analysis method of claim 1, in which the providing step comprises the step of providing the automated hint to one or more selected from the list consisting of:
    i. an application separate from the videogame; and
    ii. an application is hosted by a different device to the computerized gaming system hosting the videogame.

11. The user analysis method of claim 1, comprising the steps of:
    measuring one or more indicators of behaviour for the scenario within the videogame as played by the current user;
    measuring one or more indicators of success for the scenario within the videogame as played by the current user;
    associating with the measured indicators of behaviour and success metadata indicative of the scenario; and
    adding the measured indicators of behaviour and success and associated metadata to the corpus.

12. A non-transitory, computer readable medium having computer executable instructions stored thereon, which when executed by a computer system, cause the computer system to assist a current user within a videogame by carrying out actions, the actions comprising:
    providing an automated user interface into which the current user enters descriptive information identifying one or more elements defining a scenario within the videogame about which the current user requests an automated hint to improve their gaming performance;
    providing the automated hint to the current user to improve their gaming performance in the scenario; wherein providing the automated hint comprises:
    obtaining one or more past statistical indicators of the current user, which represent past gaming behaviour of the current user in the scenario within the videogame, wherein the one or more past statistical indicators of the current user are retrieved from storage in a computer memory of a computerized gaming system;
    determining respective statistical differences between the one or more past statistical indicators of the current user and corresponding past statistical indicators of a subset of other users, among a plurality of other users, which represent past gaming behaviour of the subset of other users in the scenario within the videogame, wherein the past statistical indicators of the subset of other users are retrieved from storage in the computer memory of the computerized gaming system after the computerized gaming system has made a determination that such past statistical indicators of the subset of other users indicate a predetermined level of success in the scenario within the videogame; and
    formulating the automated hint, which if carried out by the current user, would produce a change in one or more of the respective differences and advance the gaming behaviour of the current user towards the predetermined level of success in the scenario within the videogame.

13. A user analysis system arranged to assist a current user within a videogame, comprising:
    a hint indication obtaining processor adapted to provide an automated user interface into which the current user enters descriptive information identifying one or more elements defining a scenario within the videogame about which the current user requests an automated hint to improve their gaming performance;
    a providing processor adapted to provide the automated hint to the current user to improve their gaming performance in the scenario; wherein the providing processor is adapted to:
    obtain one or more past statistical indicators of the current user, which represent past gaming behaviour of the current user in the scenario within the videogame, wherein the one or more past statistical indicators of the current user are retrieved from storage in a computer memory of a computerized gaming system;
    determining respective statistical differences between the one or more past statistical indicators of the current user and corresponding past statistical indicators of a subset of other users, among a plurality of other users, which represent past gaming behaviour of the subset of other users in the scenario within the videogame, wherein the past statistical indicators of the subset of other users are retrieved from storage in the computer memory of the computerized gaming system after the computerized gaming system has made a determination that such past statistical indicators of the subset of other users indicate a predetermined level of success in the scenario within the videogame; and formulating the automated hint, which if carried out by the current user, would produce a change in one or more of the respective differences and advance the gaming behaviour of the current user towards the predetermined level of success in the scenario within the videogame.

14. The user analysis system of claim 13, comprising:

a measuring processor adapted to measure one or more indicators of success for the scenario within the videogame as played by the current user; and wherein the hint indication obtaining processor comprises a detecting processor adapted to detect if the one or more measured indicators of success are below an evaluation threshold.

15. The user analysis system of claim 13, in which the providing processor is adapted to provide the automated hint to an application separate from the videogame.

\* \* \* \* \*